May 28, 1968   R. L. SMIRL   3,385,409
CLUTCH DEVICE
Filed Dec. 30, 1965   3 Sheets-Sheet 1
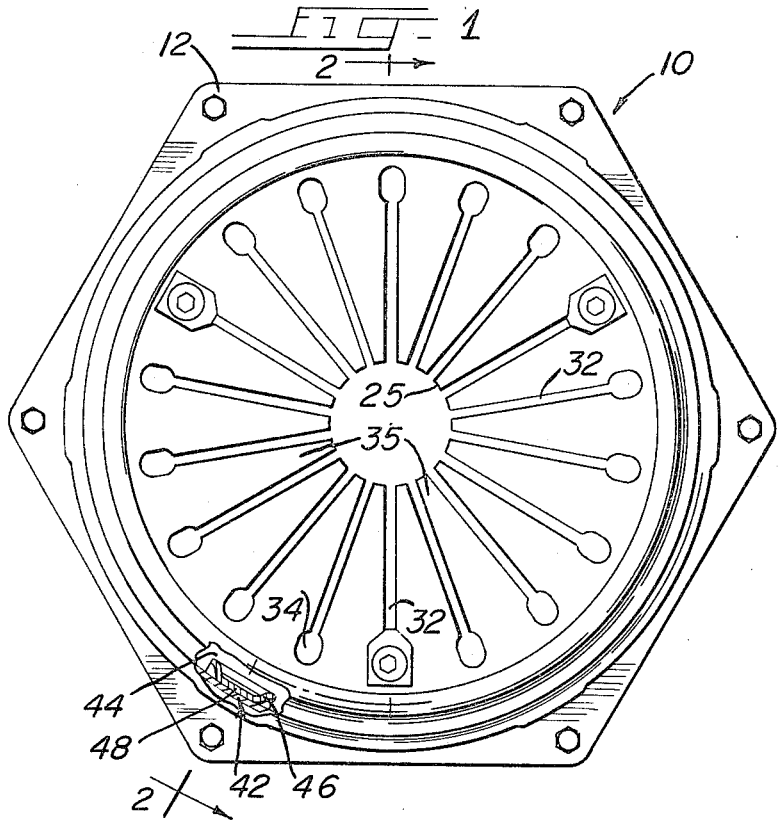
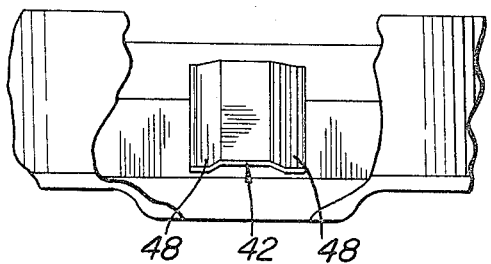
INVENTOR.
RICHARD L. SMIRL
BY *Joseph W. Malleck*

May 28, 1968  R. L. SMIRL  3,385,409
CLUTCH DEVICE
Filed Dec. 30, 1965  3 Sheets-Sheet 2
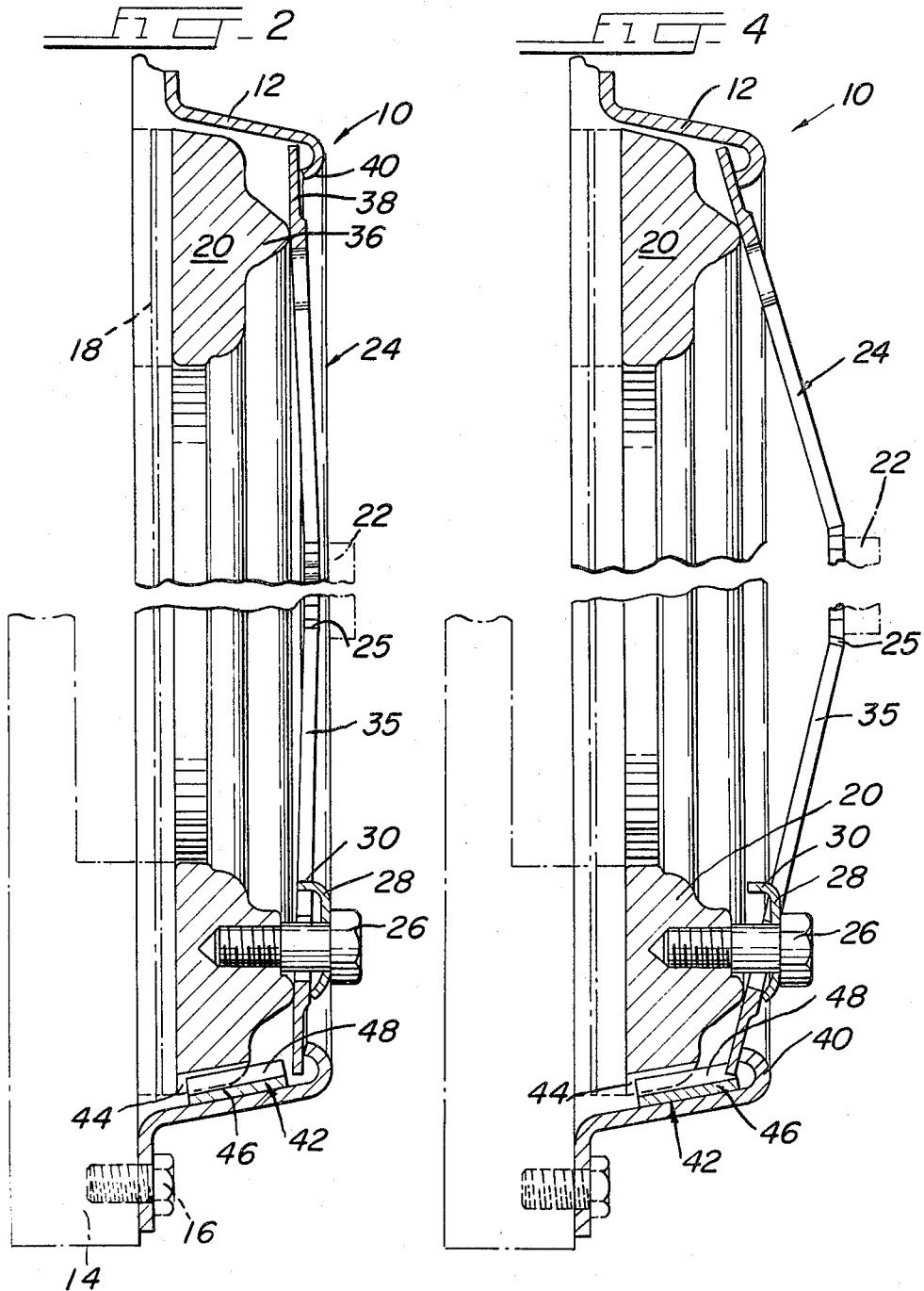
INVENTOR
RICHARD L. SMIRL
BY Joseph W. Malleck
ATTY.

May 28, 1968 R. L. SMIRL 3,385,409
CLUTCH DEVICE
Filed Dec. 30, 1965 3 Sheets-Sheet 3
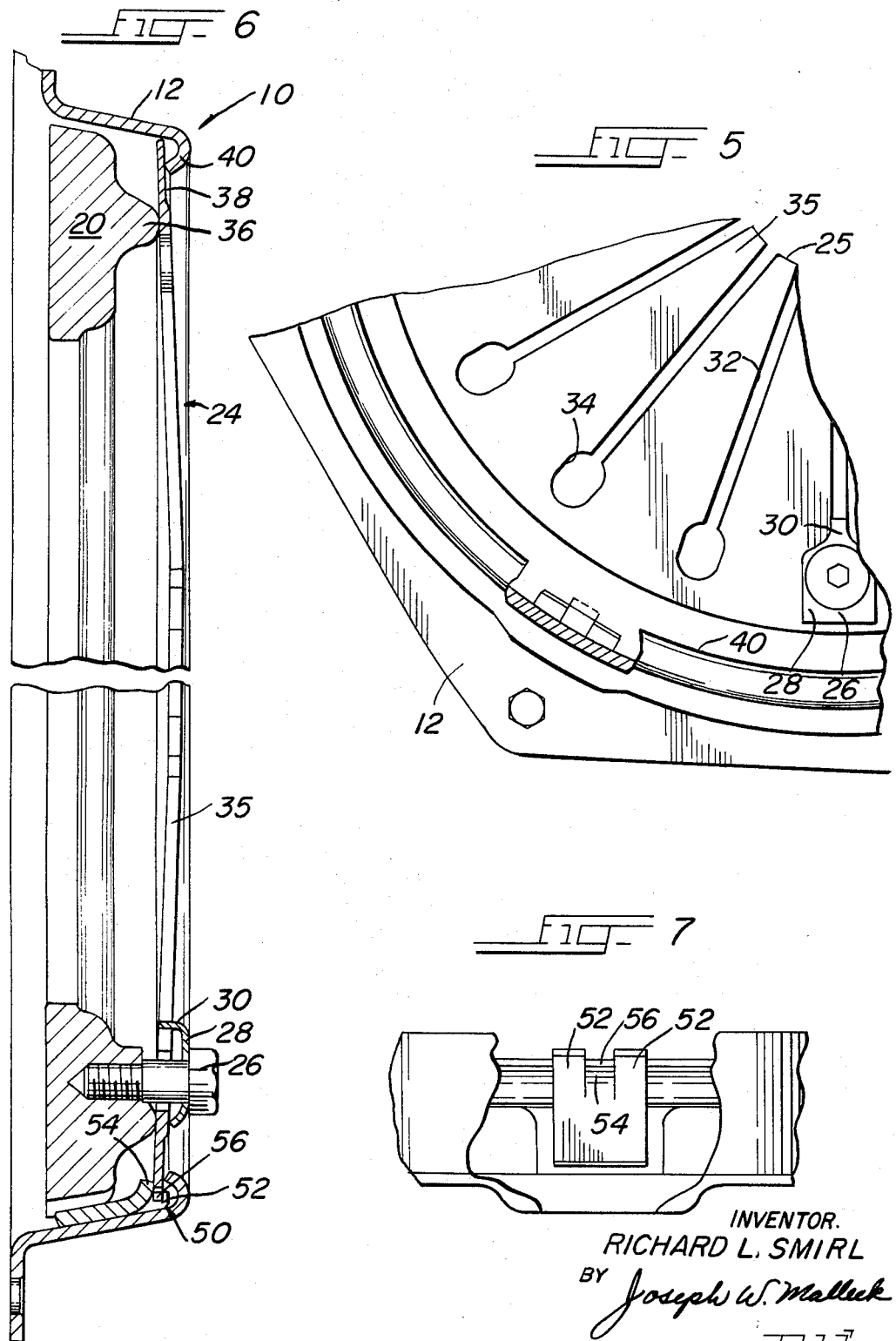
INVENTOR.
RICHARD L. SMIRL
BY Joseph W. Malleck
ATTY.

United States Patent Office 3,385,409
Patented May 28, 1968

3,385,409
CLUTCH DEVICE
Richard L. Smirl, La Grange Park, Ill., assignor to Borg-Warner Corporation, Chicago, Ill., a corporation of Illinois
Filed Dec. 30, 1965, Ser. No. 517,533
1 Claim. (Cl. 192—70.11)

ABSTRACT OF THE DISCLOSURE

A remote spring type friction disc clutch includes a diaphragm ring having inwardly extending tangs providing a unitary system of levers for applying engaging force to the pressure plate. A thinner annular portion extends around the margin of the disc to provide a resilient retractor spring. The annular portion is flexed when the clutch is applied and recovers, pulling the pressure plate away from the friction disc when the clutch engaging force is released.

---

This invention relates to power-stop control mechanisms and more particularly to a clutch of the friction disc type having an improved engaging mechanism.

Heretofore, clutches of the friction disc type have employed a plurality of circumferentially spaced individual levers to effect engagement of the pressure plate with the driven plate. These clutches have been successful but were characterized by certain disadvantages. One disadvantage of the individual lever system was its complexity and the need for careful machining of the constituent parts to assure effective operation over a relatively long period of time. Another disadvantage of the conventional lever system was the relatively large axial length required. The axial length requirement has been diminished somewhat by the use of remote spring systems, but, the demands by the public for increased horsepower has required the use of engines of progressively increased length. As a result, there is a need for an automotive clutch of the remote spring type having even less axial length than clutches having a plurality of circumferentially spaced individual levers. Another disadvantage of the conventional clutch is the relatively expensive retractor system for the pressure plate. Commonly, the retractor system takes the form of a plurality of circumferentially spaced straps which operate upon disengagement of the clutch to move the pressure plate away from the driven plate to preclude dragging and needless wear.

A primary object of the invention is, therefore, to provide a clutch of the friction-disc remote-spring type wherein the conventional lever system is eliminated and in which a single means is utilized to effect the lever function and to retract the pressure plate.

A further object of the invention is to provide a clutch of the friction disc type in which torque is transmitted by a cover plate to the pressure plate by means of a plurality of lugs disposed in circumferentially spaced relation on the pressure plate periphery and adapted to cooperate with a plurality of circumferentially spaced brackets secured on the inner surface of the cover plate.

Another object of the invention is to provide a clutch of the stated type in which the lever and retractor functions are carried out by a single ring of the diaphragm type and in which torque is transmitted to the pressure plate through the ring.

A further object of the invention is to provide a clutch of the remote spring type in which the clutch is normally maintained in engaged condition by an axially movable thrust bearing whose force is amplified by a lever system comprising a ring having a plurality of circumferentially spaced radially inwardly extending tangs the inner ends of which are engaged by the thrust bearing, and in which the pressure plate is secured to the ring for retraction of the pressure plate when the thrust bearing is moved to disengaged condition.

Other objects of the invention will be apparent as the description proceeds with reference to the accompanying drawings, wherein:

FIGURE 1 is an elevational view of a clutch made in accordance with the present invention;

FIGURE 2 is an enlarged sectional view, partly broken away, taken substantially on line 2—2 of FIGURE 1 and illustrating the clutch in engaged condition;

FIGURE 3 is an enlarged bottom view of the pressure plate drive detail, the cover plate being cut away for the sake of clarity;

FIGURE 4 is a view similar to FIGURE 2 but showing the clutch in the disengaged condition;

FIGURE 5 is a fragmentary end view of a clutch made in accordance with a modified form of the invention;

FIGURE 6 is an elevational sectional view, partly broken away, of the clutch of FIGURE 5; and FIGURE 7 is a bottom view of the pressure plate drive means of the form of the invention of FIGURE 5, the cover plate being broken away for the sake of clarity.

Referring to the drawings and more particularly to FIGURES 1, 2 and 4, the clutch of the present invention is indicated generally by reference numeral 10 and includes a cover plate 12 illustrated as being secured to an engine flywheel 14 (illustrated in dot and dash lines) by means of a plurality of circumferentially spaced cap screws 16. The clutch 10 further includes a driven element 18 illustrated in dot and dash lines, a pressure plate 20 movable from the engaged position illustrated in FIGURE 2, in which position the driven element 18 is urged into frictional engagement with the flywheel 14, to the disengaged position illustrated in FIGURE 4. Movement of the pressure plate from the position illustrated in FIGURE 4 to the position illustrated in FIGURE 2 is effected by moving a thrust bearing 22 axially to the left.

According to an important feature of the present invention the force of the thrust bearing 22 is amplified by a unitary lever system exemplified by a diaphragm ring 24. The diaphragm ring 24 is deflected by engagement with the thrust bearing 22 so that it assumes the position shown in FIGURE 2. The ring 24 has a central opening 25 and a plurality of circumferentially spaced slits 32 each terminating in an enlarged opening 34 and defining therebetween a plurality of radially inwardly extending tangs 35 the inner ends of which are engaged by thrust bearing 22.

The thrust bearing 22 may be maintained in the engaged position illustrated in FIGURE 2 by means of a suitable linkage of the remote spring type. The linkage is actuated to permit movement of the thrust bearing 22 to the disengaged position. The ring 24 is secured to the pressure plate 20 by means of a plurality of circumferentially spaced fastening elements 26. Secured to each fastening element 26 is a retainer 28 which has a flange 30 extending between one of the slits 32 to prevent relative rotation between the ring 24 and the pressure plate 20.

The pressure plate 20 is formed with a continuous ridge 36 on its right face, as viewed in FIGURES 2 and 4. The ridge 36 forms a pressure point for the ring 24. The outer marginal edge of the ring 24 is of reduced thickness as illustrated at 38 and engages an inwardly turned flange 40 of the cover plate 12 to form a fulcrum for the lever action of the ring 24 about the ridge 36. It will be appreciated that disengagement of the clutch may be effected by releasing the thrust bearing 22 so that it is free to move to the right. The ring 24 assumes the position illustrated in FIGURE 4 and, since the ring 24 is connected to the pressure plate 20, the pressure plate is moved slightly to the right out of engagement with the driven member 18.

According to another feature of the present invention torque is transmitted to the pressure plate 20 from the cover plate 12 by means of a plurality of circumferentially spaced brackets 42 each of which engages a slot or keyway 44 in the periphery of the pressure plate 20. Each bracket 42, as illustrated best in FIGURES 1 and 3, has a base portion 46 secured by any suitable means, such as welding or the like, to the cover plate 12 and a pair of angular outwardly extending arms 48 which engage the ends of recess 44.

In FIGURES 5, 6, and 7 is illustrated a modified form of the present invention in which like reference numerals indicate like parts. In this form the torque is transmitted through the ring 24 to eliminate friction at the pressure plate driving slots 44 during engagement. In lieu of the brackets 42 and keyways 44 of the principal form of the invention, the clutch of the modified form of the invention is provided with a plurality of brackets 50 which engage the periphery of the ring 24. In this manner the pressure plate 20 is driven by the cover plate 12 through the ring 24. It will be noted that the bracket 50 also serves to maintain radial alignment of the pressure plate. Each of the brackets 50, as shown clearly in FIGURE 7, includes a pair of end sections 52 and an upturned central section 54 which, as clearly illustrated in FIGURE 6, is in abutting relation to the marginal edge of the ring 24. The periphery of the ring 24 in this modified form of the present invention is provided with a plurality of keyways 56 which receive the sections 52 to afford the requisite driving connection.

The clutch of the present invention exhibits important advantages over clutches heretofore known. For instance, the number of constituent parts is substantially reduced, as compared to a clutch of the type having an individual lever system. Also, the need for a relatively complex retraction system for the pressure plate is not required since the ring 24 serves the dual function of forcing the pressure plate into engaging relation with the driven member 18 and also functions as a retractor for the pressure plate. Furthermore, the driving connection between the cover plate and the pressure plate in each of the forms of the invention described are relatively simple as compared to the driving connections of remote spring type clutches of the prior art.

I claim:

1. A remote spring clutch including a driving member (14), a driven plate (18) adapted for connection to an output shaft, and a pressure plate (20), said clutch having improved lever means for selectively frictionally gripping said driven plate between said driving member and said pressure plate responsive to actuation of an axially moveable thrust collar (22), said lever means comprising a diaphragm ring (24) having a plurality of circumferentially spaced radially inwardly extending elongated tangs (35) having inner ends thereof adapted to engage said axially moveable thrust collar, said diaphragm ring also including an outer marginal annular portion (38) of reduced thickness imparting resilient properties to the outer portion of said ring, said annular portion arranged to react against an annular flange (40), said ring being connected to said pressure plate inwardly adjacent of said annular portion, whereby actuation of said thrust collar is effective to resiliently flex said annular portion attendant to fulcruming said pressure plate against said driving member, said annular portion providing rapid retraction of said pressure plate from said driven member upon release of said thrust collar.

References Cited

UNITED STATES PATENTS

| | | | |
|---|---|---|---|
| 2,031,311 | 2/1936 | Harris | 192—89 X |
| 2,073,146 | 3/1937 | Gardiner | 192—68 |
| 2,201,340 | 5/1940 | Hunt | 192—68 |
| 2,234,755 | 3/1941 | Geyer | 192—68 |

DONLEY J. STOCKING, *Primary Examiner.*

ARTHUR T. McKEON, *Examiner.*